Patented May 6, 1952

2,596,085

UNITED STATES PATENT OFFICE 2,596,085

ELASTIC HYDROCARBON-SUBSTITUTED POLYSILOXANES AND AMMONIUM CARBONATE AS CATALYST

Wilbur J. Wormuth, Schenectady, N. Y., assignor to General Electric Company, a corporation of New York No Drawing. Application August 22, 1951, Serial No. 243,173

7 Claims.  (Cl. 260—37.5)

1

This invention is concerned with heat-convertible compositions of matter and methods of preparing the same. More particularly, the invention relates to a heat-convertible composition of matter comprising (1) a heat-curable, polymerized, hydrocarbon-substituted polysiloxane containing an average of from about 1.95 to 2.2, e. g., 1.98 to 2.0, hydrocarbon groups per silicon atom, said hydrocarbon groups being attached to the silicon atoms through C—Si linkages, and (2) ammonium carbonate present in a minor proportion of the weight of (1), for example, in an amount ranging from about 0.1 to 4 per cent or more by weight.

Relatively few materials have been known to vulcanize heat-convertible hydrocarbon-substituted polysiloxanes convertible to the solid elastic state. Although a few have been known, as for instance, benzoyl peroxide, tertiary butyl perbenzoate, and zirconyl nitrate, as far as I am aware, there are no catalysts for effecting such vulcanization which will cause the silicone heat-convertible composition to convert to the substantially insoluble and infusible elastic state at low temperatures, as, for example, at room temperatures within reasonable times.

I have discovered that small amounts of ammonium carbonate when added to a silicone rubber stock (either liquid or gum) will cause vulcanization of the silicone rubber stock and will effect such vulcanization or curing of the silicone rubber stock to the substantially infusible and insoluble state at temperatures as low as room temperature in relatively short periods of time to give products whose properties are comparable in many respects to the properties of silicone rubbers cured or vulcanized by means of other cure accelerators heretofore employed for the purpose. With further aging at room temperature, an increase in the tensile strength of the product may be realized.

The heat-curable hydrocarbon-substituted polysiloxanes with which this invention is concerned may be described as polysiloxanes consisting of hydrocarbon radicals and silicon and oxygen atoms having the recurring structural unit

where R and R' are the same or different monovalent hydrocarbon radicals. Examples of such hydrocarbon radicals are aliphatic radicals, for instance, alkyl radicals (e. g., methyl, ethyl, propyl, isopropyl, etc.), unsaturated radicals (e. g., vinyl radicals, etc.), aryl radicals (e. g., phenyl, naphthyl, etc.), aralkyl radicals (e. g., benzyl, phenylethyl, etc.), alkaryl radicals (e. g., tolyl, ethylphenyl, etc.), acyclic radicals (e. g., cyclopentyl, cyclohexyl, etc.). Preferably R and R' are lower alkyl radicals, more particularly the methyl radical, and are the same, and may, if desired, also contain minor molar proportions, e. g., up to 10 to 15 mol per cent, of phenyl radicals.

A more complete description of the nature of the heat convertible organopolysiloxanes with which my invention is concerned which may be converted to the vulcanized synthetic elastomeric stage may be found in the various applications and patents mentioned in Marsden Patent 2,521,528 issued September 5, 1950 and assigned to the same assignee as the present invention. These aforementioned patents and applications described in the Marsden patent, which by reference are all made part of the present application, also contain various methods by which the uncured solid elastic products may be obtained from various liquid non-resinous, hydrocarbon-substituted polysiloxanes.

In the preferred embodiments of my invention, the heat-convertible polymerized hydrocarbon-substituted polysiloxane, which may be in the solid elastic state or in the highly viscous liquid somewhat lower molecular weight state, is one in which the average ratio of hydrocarbon groups of silicon atoms ranges from about 1.95 to 2.2 hydrocarbon groups of silicon atoms, and where at least 90 per cent of the silicon atoms have two hydrocarbon radicals attached thereto, the remaining 10 per cent or less of the silicon atoms having from 1 to 3 hydrocarbon radicals attached to the silicon atoms, so that the over-all proportion of hydrocarbon radicals to silicon atoms in the entire hydrocarbon-substituted polysiloxane is still within the range of 1.95 to 2.2. Preferably the curable hydrocarbon-substituted polysiloxane (e. g., methyl polysiloxane) contains an average of from about 1.98 to 2.0 hydrocarbon (e. g., methyl) radicals per silicon atom, the said hydrocarbon-substituted polysiloxane being obtained by condensing a liquid polymeric dihydrocarbon-substituted siloxane (e. g., polymeric dimethylsiloxane), with or without up to 2 mol per cent copolymerized monohydrocarbon-substituted siloxane (e. g., monomethyl siloxane) as disclosed more fully in the previous mentioned patents of Wright et al. U. S. 2,448,565, and Agens Patent U. S. 2,448,756 referred to in the previously mentioned Marsden patent.

In order to prepare a synthetic elastomer from the heat-curable product, the latter may be worked on ordinary mixing or differential rubber rolls with the ammonium carbonate, and if desired, with any filler which may be added during this operation. Thereafter, this mixture may be molded under the influence of pressure and with heat if desired, and then allowed to stand at room temperatures, or at temperatures ranging, for example, from about 25° to 50° C. until further cure is obtained. Alternatively, the molded product may be further cured or heat-treated at elevated temperatures in an oven until the desired degree of cure is obtained at an accelerated rate over that possible by permitting the molded product to remain at around room temperature for long periods of time.

The amount of ammonium carbonate added to the elastic product depends to some extent on the desired characteristics of the cured product. Generally, the ammonium carbonate is used in amounts ranging from about 0.1 to 4 per cent or more, preferably from about 0.5 to 2 per cent, by weight, based on the weight of the heat-curable hydrocarbon-substituted polysiloxane. Although larger quantities may be employed, the amount of ammonium carbonate employed as a curing agent ordinarily should not exceed about 4 per cent, particularly where the finally cured product will be continuously subjected to elevated temperatures above 175° C.

Among the fillers which may be employed in this invention may be mentioned inorganic fillers, for example, lithopone, ferric oxide, titanium dioxide, talc, zinc oxide, silica, silica aerogel, particularly finely divided silicas coming within the scope of the disclosures in Warrick Patent 2,541,137 issued February 13, 1951. The aforementioned fillers may be incorporated in the elastic products in amounts ranging from about 10 or 90 per cent or even higher, preferably from about 25 to 75 per cent of the total weight of the filler and the elastic product.

In order that those skilled in the art may better understand how the present invention may be practiced, the following examples are given by way of illustration and not by way of limitation. All parts are by weight.

*Example 1*

Dimethyl silicone oil obtained by hydrolyzing essentially pure dimethyl dichlorosilane was condensed with a small amount of potassium hydroxide to give a high molecular weight highly viscous dimethyl polysiloxane. Approximately 100 parts of this viscous product were mixed with 40 parts of silica aerogel in a finely divided state on rubber compounding rolls. To this mixture was added one part ammonium carbonate. The mixture was pressed in a mold, removed, and allowed to age at room temperature for 20 days. At the end of this time the product had grown strong and flexible and had a tensile strength of 280 p. s. i., an elongation of 287 per cent, and a Shore hardness of 47.

I have found that the cure acceleration of the heat convertible organopolysiloxanes at room temperature may be further improved if one incorporates with the ammonium carbonate small amounts of known cure accelerators for silicone rubbers. Thus, one may employ additional cure accelerators such as, for example, benzoyl peroxide, tertiary butyl perbenzoate, zirconyl nitrate, etc., with the ammonium carbonate in amounts ranging from about 0.1 to 5 or more parts of the aforementioned cure accelerators per part of ammonium carbonate. Omitting the ammonium carbonate or omitting the other curing catalysts, examples of which have been given above, will not give a cure of the heat-convertible organopolysiloxane at room temperatures within anywhere near the length of time found effective in effecting cure at room temperature when the ammonium carbonate and the other cure accelerators are used in combined form.

*Example 2*

This example illustrates the effect of using another cure accelerator with the ammonium carbonate in connection with a heat-convertible organopolysiloxane. More particularly, the mixture of 100 parts high molecular weight, viscous dimethyl polysiloxane and 40 parts silica aerogel described above in Example 1 was mixed with 1.5 parts benzoyl peroxide and 1.0 part ammonium carbonate. The mixture was compounded on the usual rubber rolls and pressed in a cold mold. After about 15 minutes there was a noticeable cure of the material. After 48 hours at room temperature, pressed samples of this composition were tested with the following results: tensile strength—536 p. s. i., elongation 550 per cent, Shore hardness 35. 96 hours later the tensile had risen to 593 p. s. i., the elongation remained at 550 per cent and the Shore hardness was approximately 37. The omission of the ammonium carbonate from the above mixture gave little if any curing at room temperature after many days standing and even after longer periods of time, the change in properties were nowhere near as spectacular as when the ammonium carbonate was included.

It will of course be apparent to those skilled in the art that in addition to the benzoyl peroxide employed above, other cure accelerators, some of which have been mentioned previously, may be employed with the ammonium carbonate to effect an acceleration of the cure at room temperature over that when these other cure accelerators are omitted from the formulation using the ammonium carbonate as the accelerator. It will also be apparent that the ammonium carbonate may be the only cure accelerator employed with the hydrocarbon-substituted polysiloxane convertible to the solid elastic state. After standing at room temperature for the required time to effect the substantial increase in the strength properties of the cured material, if desired, additional heat treatment may be used to accelerate the curing. This latter heat treatment may of course require relatively lower temperatures than is usually required, when using, for instance, cure accelerators or vulcanizers such as benzoyl peroxide. The use of other cure accelerators with the ammonium carbonate may require only fractions of one per cent to give the added effect described above. Thus, I may use amounts of other cure accelerators ranging, for example, from about 0.01 to 5 or 6 per cent or more by weight, based on the weight of the heat-convertible organopolysiloxane.

Synthetic elastomers, i. e., the synthetic silicone elastomers, prepared and vulcanized in accordance with my invention are capable of withstanding elevated temperatures (150° to 200° C.) for extended periods of time, and retain their desirable rubbery properties at temperatures as low as −50° to −60° C. Such a range of properties makes them highly useful as insulation materials, for electrical conductors, gasket material, shock absorbers, and for other applications for which known natural or synthetic rubbers are not suitable. The use of room temperature-curable silicone rubber permits curing of the silicone rubber in situ in many instances, and in applications where it is not practical to subject curableable molded silicone rubber to heat curing.

What I claim as new and desire to secure by Letters Patent of the United States is:

1. A heat-convertible composition of matter comprising (1) a heat-curable polymerized hydrocarbon-substituted polysiloxane, wherein the hydrocarbon radicals are members selected from the class consisting of alkyl, aryl, aralkyl and alkaryl radicals, and containing an average of from 1.95 to 2.2 hydrocarbon groups per silicon atom, and (2) a minor proportion of ammonium carbonate as a cure accelerator for the aforesaid polysiloxane.

2. A heat-convertible composition of matter comprising (1) a heat-convertible polymerized methylpolysiloxane containing an average of from 1.98 to 2.0 methyl groups per silicon atom, the said methylpolysiloxane consisting of methyl groups attached to the silicon atoms by carbon-silicon linkages, and silicon and oxygen atoms, and (2) a minor proportion of ammonium carbonate.

3. A product comprising the cured composition of claim 1.

4. A product comprising the cured composition of claim 2.

5. A composition of matter comprising (1) a heat-convertible polymerized, methylpolysiloxane containing from 1.98 to 2.0 methyl groups per silicon atom, (2) a filler, and (3) from 0.25 to 4 per cent, by weight, ammonium carbonate based on the weight of (1).

6. A convertible composition of matter as in claim 5, wherein the filler comprises a finely divided silica aerogel.

7. A cured elastomeric article of manufacture comprising the product of molding a composition of matter comprising (1) a heat-convertible polymerized methylpolysiloxane containing an average of from 1.98 to 2.0 methyl groups per silicon atom, (2) a filler comprising silica aerogel, (3) a minor proportion of ammonium carbonate, and (4) a small amount of benzoyl peroxide.

WILBUR J. WORMUTH.

REFERENCES CITED

The following references are of record in the file of this patent:

UNITED STATES PATENTS

| Number | Name | Date |
|---|---|---|
| 2,482,276 | Hyde et al. | Sept. 20, 1949 |
| 2,546,036 | Marsden | Mar. 20, 1951 |